Nov. 13, 1962     A. M. TRAX     3,063,777
METHOD OF REBUILDING ELECTRON TUBES
Filed May 2, 1960

Fig. 1.

```
┌─────────────────────────────┐
│ OPEN ENVELOPE AND ADMIT     │
│         ONLY                │
│ NON-CONTAMINATING GAS       │
└─────────────────────────────┘
              │
              ▼
┌─────────────────────────────┐
│ WHILE MAINTAINING CRT       │
│ FILLED WITH SAID GAS:       │
│ CRACK OFF NECK SECTION      │
│ ADJACENT STEM, SPLICE       │
│ NEW NECK SECTION TO CRT     │
│ NECK, AND INSERT AND SEAL   │
│ IN NEW ELECTRON GUN MOUNT   │
│ AND STEM.                   │
└─────────────────────────────┘
              │
              ▼
┌─────────────────────────────┐
│ EXHAUST CRT WITHOUT         │
│ PERMITTING OTHER THAN       │
│ SAID GAS TO HAVE ENTERED    │
│ TUBE.                       │
└─────────────────────────────┘
              │
              ▼
┌─────────────────────────────┐
│ PERFORM CONVENTIONAL        │
│ CATHODE ACTIVATION, TIP     │
│ OFF, GETTER FLASH, AND      │
│ AGING PROCESSING.           │
└─────────────────────────────┘
```

INVENTOR.
Alan M. Trax
BY *William A. Galesak*
ATTORNEY

Nov. 13, 1962 A. M. TRAX 3,063,777
METHOD OF REBUILDING ELECTRON TUBES
Filed May 2, 1960 2 Sheets-Sheet 2
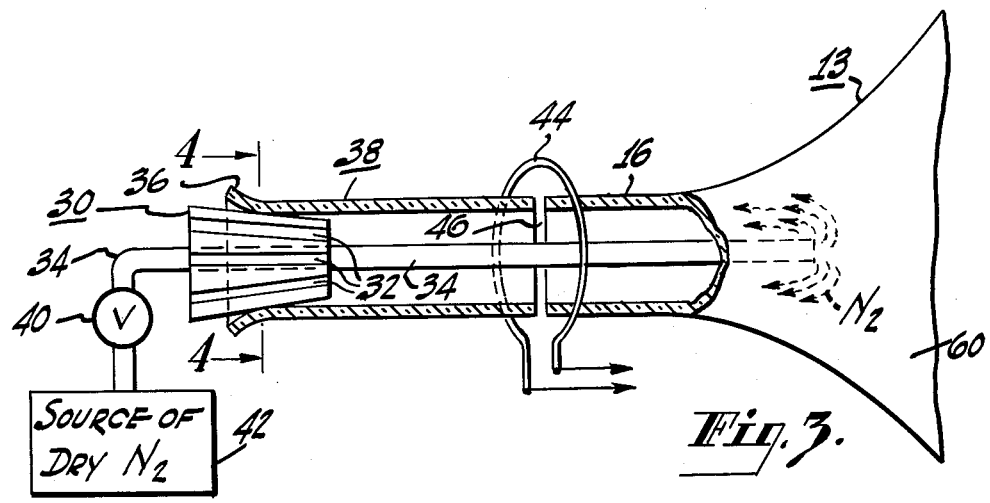
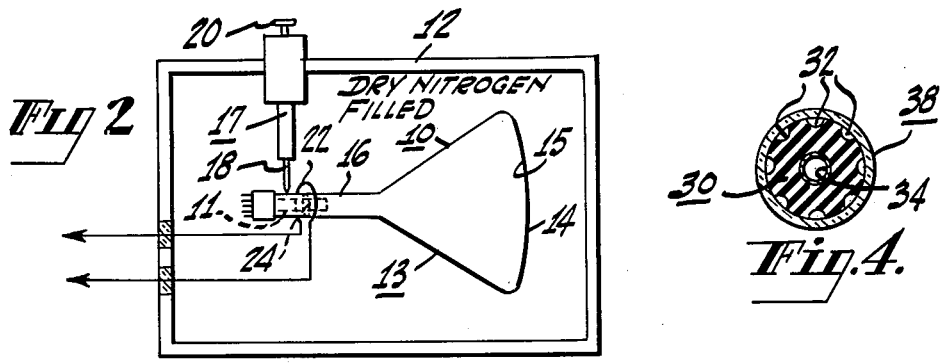
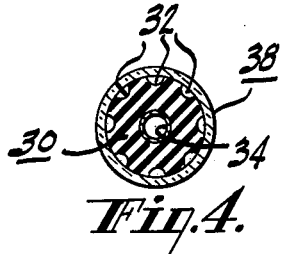
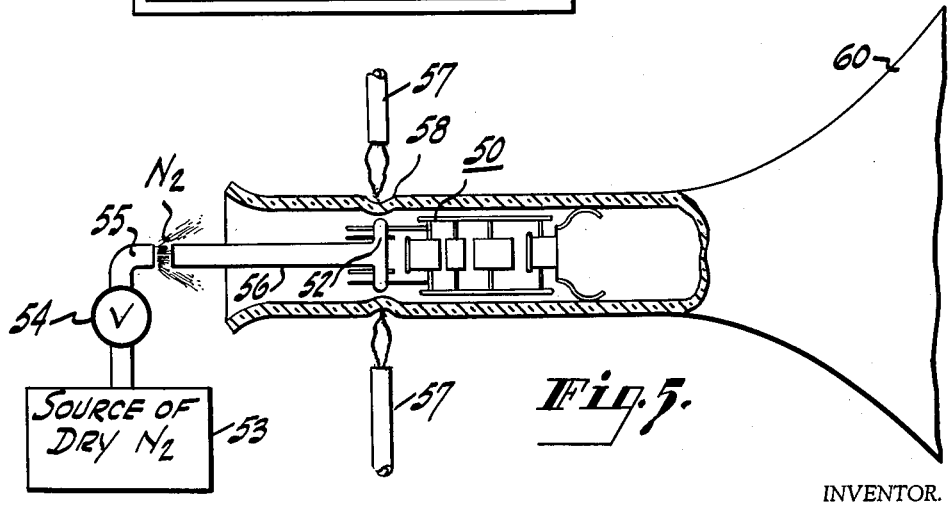
INVENTOR.
Alan M. Trax
BY
William A. Zalesak
ATTORNEY

United States Patent Office 3,063,777
Patented Nov. 13, 1962

3,063,777
METHOD OF REBUILDING ELECTRON TUBES
Alan M. Trax, Marion, Ind., assignor to Radio Corporation of America, a corporation of Delaware
Filed May 2, 1960, Ser. No. 26,177
10 Claims. (Cl. 316—2)

This invention relates to the manufacture of electron tubes and particularly to a novel method of rebuilding cathode ray tubes wherein an internal defective part or assembly is replaced with a good part or assembly.

While this invention will be described as applied to the rebuilding of cathode ray tubes of the type generally used in present-day television receivers, other kinds of electron tubes having vacuum enclosures, particularly those employing electron guns and phosphor screens, can be rebuilt in accordance with this invention.

Cathode ray tubes of the type generally employed in television receivers comprise an envelope including a neck section, a funnel section, and a faceplate. A phosphor screen is disposed on the internal surface of the faceplate and an electron gun is positioned in the neck section to project an electron beam toward and upon the phosphor screen. In the manufacture of such cathode ray tubes, a defective electron gun is occasionally incorporated into what is otherwise a good tube. Also, the electron gun of a normally good tube becomes defective after a normal life span of tube operation. In either case, the phosphor screen and envelope of the tube may be perfectly suitable for further use. Accordingly, it has been the practice to rebuild such cathode ray tubes by replacing the defective gun with a new gun.

According to well-known prior art practices, the rebuilding of such defective cathode ray tubes comprises first opening the envelope of the tube to admit air and thus equalize the pressures on the inside and outside of the tube envelope. A section of the neck is then cracked off and the old electron gun removed. A new neck section is then spliced onto the tube to provide a complete envelope. The remainder of the rebuilding process then follows the usual manufacturing steps used in completing a new tube.

Specifically, the remainder of the rebuilding process begins with a bake-out schedule to drive off water and other gases detrimental to the tube parts. Such gases may include carbon dioxide and oxygen which have become occluded in the glass envelope, the phosphor screen, the aluminum coating on the phosphor screen, or other various coatings within the envelope by virtue of the interior of the tube having been exposed to the atmosphere. This bake-out schedule usually comprises a heating of the envelope and phosphor screen at approximately 400–450° C. for a period of one to two hours.

After the undesirable gases are driven from the tube parts, a new electron gun and stem assembly are positioned in place and sealed to the new neck section of the tube envelope. The tube is then subjected to a final bake-out and exhaust schedule before the enevolpe is sealed closed by tipping-off an exhaust tubulation. The rebuilding of the cathode ray tube is completed by a conventional cathode activation, getter flashing, and aging processing.

A large portion of the expense of such rebuilding of cathode ray tubes involves the bake-out schedule to which the tube must be subjected. Such a bake-out schedule has been considered necessary in order to rid the tube of the undesirable water vapor and poisonous gases which are admitted the tube envelope when the envelope is opened to the atmosphere. Not only does this bake-out schedule represent an expense from the standpoint of elaborate and costly equipment, but also from the standpoint of the space required for such equipment and of the extensive time required for such processing.

Bake-out processing during rebuilding is not only undesirable because of its high cost, but for certain tube types, also because of the high temperature to which the tube must be subjected during bake-out. One type of cathode ray tube recently made available by the industry includes a separate glass cap bonded to and over the exterior surface of the faceplate for the purpose of viewer protection against implosion accidents. Such protective caps are bonded to the faceplate with suitable organic materials such as epoxy resins which are not capable of withstanding the usual bake-out temperatures employed in prior art rebuilding techniques.

Accordingly, it is an object of my invention to provide an improved method of rebuilding or repairing electron tubes having a defective part therein.

Particularly, it is an object of my invention to provide an improved and novel method of rebuilding a cathode ray tube wherein a baking-out of the tube is not necessary.

Briefly, according to my invention, a rebuilding process is provided which differs from the conventional prior art processing in that while the tube envelope is open during processing, the envelope is kept filled with a suitable gas so as to prevent undesirable water vapor and other tube-contaminating gases from entering the envelope. Thus, a baking-out of the tube is made unnecessary.

In the drawings:

FIG. 1 is a block diagram flow chart setting forth a tube rebuilding method including steps according to my invention;

FIGS. 2, 3, and 5 illustrate steps and apparatus used according to a preferred method of practicing my invention; and FIG. 4 is a transverse section taken along line 4—4 of FIG. 3.

According to the flow chart of FIG. 1, which illustrates one way of practicing my invention, the envelope of the cathode ray tube is opened under such conditions that only a noncontaminating gas is admitted thereto. Then, while maintaining the tube filled with such gas, a section of the nect is "cracked" off, a new neck section spliced to the tube, and a new electron gun and stem assembly positioned in place and "sealed" to the new neck section. The tube is then exhausted without having permitted a gas other than said noncontaminating gas to have entered the envelope. Finally, the tube is subjected to conventional finish processing steps of cathode activation, tip-off of the exhaust tubulation to seal the envelope, getter flashing, and aging of the tube parts.

As used herein, the term "noncontaminating gas" means a gas which does not include sufficient amounts of any constituents such as water vapor, oxygen, or carbon dioxide, which if permitted to come into contact with internal parts of the tube would result in impairing normal tube operation or life expectancy after exhaust and re-sealing. Such impairment might result from contaminates becoming occluded at normal room temperature in the tube parts and then subsequently being released upon a heating of the tube due to normal operation thereof.

Rebuilding of cathode ray tubes according to my invention eliminates the generally imposed requirements of the prior art for tube rebuilding. It has heretofore been believed necessary that a cathode ray tube must undergo a bake-out during rebuilding in order to obtain a suitable product. However, cathode ray tubes rebuilt, according to my invention, have been successfully operated for thousands of hours.

Inasmuch as water vapor is believed to constitute the most harmful contaminate encountered when tubes are opened to the atmosphere, a prime prerequisite of the gas filling according to my invention is that it be dry, i.e., free of harmful amounts of water vapor. Moreover, the dry gas employed should be one which itself does not in any way destructively contaminate the tube parts and coatings within the tube envelope.

In order to best insure the absence of any contaminating or poisoning gases, an inert gas such as argon, helium, neon, or the like can be used. However, inasmuch as nitrogen is nonreactive with the tube parts involved, and further, since nitrogen is relatively inexpensive and easy to provide in a substantially dry condition, it constitutes a preferred gas for use according to my invention. However, since water vapor constitutes the chief contaminent, dry air might be used. The air can be passed over or through a carbon dioxide absorber to further decrease the contaminents.

Maintenance of a suitable gas filling of the tube envelope during processing according to my invention can be achieved in various ways. For example, the tube, after being opened, may be continuously flushed with the chosen gas, or the tube may be processed within a cabinet containing only the chosen gas, or the tube may be processed in a room in which the manufacturing personnel therein are provided with suitable gas masks. It will thus be appreciated that the following preferred method of practicing my invention in no way sets forth a limitation to the scope of my invention.

One way of practicing my invention is shown in FIG. 2. A cathode ray tube 10, for example having a defective electron gun 11 or other replaceable part, is first placed in dry nitrogen atmoshpere having a pressure greater than one atmosphere. This may be accomplished by enclosing the cathode ray tube in, e.g., a plastic bag or a cabinet 12 which is filled with dry nitrogen. The tube 10 may be of the type comprising an envelope 13 including a faceplate 14, on the internal surface of which a phosphor screen 15 is deposited, and a neck 16, which houses the electron gun 11.

Suitable means 17 is provided for making a small hole through the neck 16 of tube envelope adjacent the stem end thereof. Such means 17 may comprise an electrically heated tip 18 which can be advanced against the neck 16 by actuation means 20 such as a screw advance. A suitable hole is thus provided so as to admit the dry nitrogen into the bulb. As stated above, it is preferred that dry nitrogen pressure slightly greater than atmospheric be provided. This insures that in the event of any leaks in the container 12 in which the tube 10 is processed nitrogen will flow out thereof rather than contaminating gases thereinto. Also, this results in a dry gas filling of the bulb of greater than atmospheric pressure, which, as hereinafter described, aids in preventing contaminating gases from entering the bulb during subsequent processing.

While still in the dry nitrogen atmosphere, a short section of the neck adjacent the stem of the envelope is cracked off with a hot wire ring 22 such as is well known in the art. This results in a clean, smooth crack off at the dotted line 24 around the neck 16. The cracked-off neck section and stem is then removed, taking therewith the defective electron gun 11.

A new neck section is next spliced to the end of the old remaining neck on the tube envelope 13. This is preferably performed on a conventional glass lathe. Accordingly, it is necessary to maintain the envelope 13 filled with the dry nitrogen when it is removed from the dry nitrogen container 12 and transferred to the lathe for chucking up. This may be done by plugging the neck opening at the crack off 24 or by providing a continuous flush of dry nitrogen into and out of the envelope.

In order to maintain the envelope 13 filled with dry nitrogen during the actual splicing of the new neck section to the tube envelope, a preferred apparatus as illustrated in FIGS. 3 and 4 is employed. The apparatus includes a stopper 30, which is provided with a plurality of flutes 32 therein and a bore centrally therethrough for snugly receiving a flushing tube 34. The stopper 30 is inserted into a flared end 36 of the new neck section 38 which is to be spliced to the old tube envelope. The flushing tube 34 is connected through a valve 40 to a source of pressurized dry nitrogen 42. Thus, the dry nitrogen may be passed from the source 42 through the flushing tube 34 and into the neck section 38 during the splicing of the neck section 38 to the old envelope 13.

The actual splicing operation may be performed conventionally with gas burners to soften the adjacent ends of the neck section 38 and the old envelope 13 or preferably by an electric radiant heater 44 and subsequent electric resistance heating of the glass parts. The latter combination heating method is preferred to avoid flame heating of the glass inasmuch as water vapor is produced by virtue of the fires.

After the nitrogen flushing assembly of FIGS. 3 and 4 is prepared, the valve 40 is opened to provide a flow of dry nitrogen through the flushing tube 34. The old envelope neck is unplugged and the new neck section 38 positioned in place adjacent thereto as illustrated in FIG. 3. During the brief time period between the unstoppering and the insertion of the flushing tube, the fact that the bulb contains dry nitrogen at a pressure greater than atmospheric insures that contaminating gases will not enter the envelope 13. Rather, dry nitrogen is expelled from the envelope to equalize internal and external pressures.

With the flushing tube 34 disposed in the envelope dry nitrogen flows into the envelope 13 and back out of the old neck section 16 and escapes through the opening 46 between the old neck section 16 and the new neck section 38. After the two neck sections 38 and 16 are softened and spliced together, the dry nitrogen is then forced on back through the new neck section 38 and escapes through the flutes 32 in the stopper 30. Thus, a continuous flushing results in a maintenance of the dry nitrogen filling within the envelope 13 during the time which the new neck section 38 is being spliced thereto.

The envelope 13 is then transferred to a main seal machine where (as shown in FIG. 5) a new electron gun 50 and stem assembly 52 is sealed thereto. During such transfer, the dry nitrogen filling of the envelope 13 is maintained either by plugging the flared opening 36 or maintaining the continuous dry nitrogen flush such as illustrated in FIG. 3.

Inasmuch as a conventional cathode emissive coating may comprise various volatilizable binders, it is preferred that the cathode of the electron gun 50 be heated in order to volatilize such binders before the gun is sealed into the envelope 13. Such heating, of course, does not comprise an integral processing of the envelope 13 itself, but may in fact be provided as a separate preprocessing of the electron gun 50. This preprocessing insures that no contaminating gases will be volatilized after the tube is completed by virtue of the operation thereof.

With the envelope 13 mounted in place on the main seal machine, the new gun 50 and stem assembly 52 are positioned in place within the neck sections 38 and 16 as illustrated in FIG. 5. In order to insure maintenance of the dry nitrogen filling within the envelope 24, dry nitrogen from a source 53 is directed through a valve 54 and from a pipe or jet 55 into the open end of a conventional exhaust tubulation 56 of the stem assembly 52. This results in a flow of dry nitrogen through the exhaust tubulation 56 and into the envelope 13. Such flow escapes back through the neck section 38 around the stem 52 and out the open end of the neck section 38.

The electron gun 50 and stem assembly 52 are then sealed into the neck section 38 by softening, e.g., by flames from gas burners 57, the neck adjacent the stem 52 to sag it into contact with the stem. The flow of dry nitrogen through the exhaust tubulation 56 serves not only to maintain a continuous dry gas filling in the envelope 13 but also to provide a slight pressure therein which prevents the heated section 58 of the neck from sagging inwardly against the electron gun 50. By virtue of the fact that the pipe 54 is spaced from the exhaust tubulation 56, the entire area surrounding the opening to the neck section 38 is flooded with a dry nitrogen atmosphere during the sealing-in of the electron gun 50 and stem assembly 52.

After sealing-in of the electron gun and stem assembly, the exhaust tubulation 56 is plugged or a continuous dry nitrogen flush is continued so that the dry nitrogen filling in the envelope 13 is maintained. The cathode ray tube 10 is then transferred to a conventional exhaust machine, and the tubulation unplugged and connected to the exhaust port of the machine. The dry nitrogen filling is then exhausted from the envelope 13.

Although heating of the envelope 13 is not required in accordance with the dry gas processing according to my invention, it may nevertheless be desired to slightly heat the funnel portion 60 of the envelope 13 to better insure complete removal of any possible gaseous contaminate which might have entered the envelope 13 through mishandling or faulty apparatus employed in the practice of the invention. Moreover, a slight heating of the funnel will enable a shorter aging cycle in the finish processing of the tube to bring the electron gun to peak efficiency. In any event such heating need not comprise an extended high temperature schedule such as that employed in prior art rebuilding bake-out schedules, but instead may involve, a temperature of, e.g., 160° F. for a period of, e.g., 30 minutes. Such heating can be beneficial and still not represent an excessive expense or be destructive of cap bonding material on the faceplate of the tube.

Following exhaust of the cathode ray tube 10 according to my invention, either in the case of a slight heating of the funnel 60 or complete absence of any heating step, the tube is subjected to a conventional finish processing thereof as is well known in the art. Such finish processing involves activation of the cathode, tipping-off of the exhaust tubulation 56 to seal the envelope closed, flashing of a new getter included as a part of the electron gun 50, and final aging of the tube by application of suitable voltages thereto.

I claim:

1. The method of repairing a cathode ray electron tube having a defect therein comprising the steps of opening the envelope of said tube, admitting noncontaminating gas only to the interior of said envelope, correcting said defect while maintaining said tube envelope filled with said non-contaminating gas only, exhausting said tube, and sealing closed said envelope.

2. The method of rebuilding a cathode ray tube comprising the steps of opening the envelope of said tube and admitting to the interior of said tube envelope a dry gas only, while maintaining said envelope filled with said dry gas only, replacing a defective part of said tube within said envelope with a good part, exhausting said tube without having permitted other than said dry gas to have entered said tube, and sealing closed said envelope.

3. The method of rebuilding a cathode ray electron tube having an evacuated envelope containing parts sensitive to contamination by water vapor, said method comprising making an opening in said envelope and admitting into the interior of said envelope through said opening only gas which is free of contaminating amounts of water vapor, maintaining said envelope filled with such gas while removing a part from said envelope and replacing it with another part, exhausting said gas from said envelope without permitting contaminating amounts of water vapor to enter said envelope, and sealing said envelope closed without subjecting it to a general bake-out.

4. The method of replacing an internal part contained within the evacuated envelope of a cathode ray electron tube with another part, comprising the steps of opening said envelope, admitting into the interior of said envelope only a gas which is non-contaminating to the internal parts of said tube, maintaining said envelope filled with said gas while replacing said internal part with another part, exhausting said gas from said envelope without having permitted contaminating amounts of any other gas to have entered said envelope, and sealing closed said envelope without a general bake-out thereof.

5. The method of rebuilding a cathode ray tube having an evacuated envelope and a part therein to be replaced; said method comprising the steps of placing said tube in an atmosphere of non-contaminating gas; opening said envelope and filling it with said gas, maintaining said envelope filled with said gas while severing a portion of said envelope from said tube and removing said portion with said part to be replaced from said tube envelope, splicing a new envelope portion onto said tube, and inserting a replacement part into said envelope and fixing said replacement part therein; exhausting said envelope without permitting any gas other than said non-contaminating gas to enter said envelope; sealing off said envelope to close said envelope; and finish processing said tube.

6. The method of rebuilding a cathode ray tube having a defective electron gun contained within an evacuated envelope including a neck, said method comprising placing said tube in an atmosphere of non-contaminating gas only; providing a hole in said neck to admit only said gas to within said envelope and thereby prevent contaminates from entering said envelope; while maintaining said tube filled with said gas, removing a portion of said neck and said defective gun from said tube, splicing a new neck section onto said envelope, and sealing in a new electron gun in said envelope; exhausting said gas from said envelope; and finish-processing said tube.

7. The method according to claim 4 and wherein said non-contaminating gas is a gas which is nonreactive with the internal parts of said tube and is substantially devoid of water vapor, oxygen, and carbon dioxide.

8. The method according to claim 6 and wherein said non-contaminating gas is nitrogen.

9. The method of rebuilding a cathode ray tube having an evacuated envelope and a part to be replaced within said envelope, said method comprising forming an opening within said envelope, admitting a dry, non-contaminating gas within said envelope through said opening, removing said part to be replaced and inserting a replacement part while maintaining said envelope filled with said noncontaminating gas, and exhausting and resealing said envelope without subjecting it to a general bake-out.

10. The method of rebuilding a cathode ray tube having an evacuated envelope and a part to be replaced within said envelope, said method comprising forming an opening within said envelope, admitting a dry, non-contaminating gas within said envelope through said opening, removing a portion of said envelope and said part to be replaced, sealing a replacement portion to said envelope, inserting a replacement part while maintaining said envelope filled with said non-contaminating gas, exhausting and resealing said envelope without a general bake-out thereof.

References Cited in the file of this patent

UNITED STATES PATENTS

| 2,122,117 | Stringer | June 28, 1938 |
| 2,882,117 | Bruining et al. | Apr. 14, 1959 |
| 2,907,619 | Groot et al. | Oct. 6, 1959 |

FOREIGN PATENTS

| 1,207,164 | France | Apr. 31, 1959 |